(12) United States Patent
Phuyal et al.

(10) Patent No.: US 11,729,765 B2
(45) Date of Patent: Aug. 15, 2023

(54) IDENTIFYING A USER EQUIPMENT ASSOCIATED WITH A PRE-CONFIGURED UPLINK RESOURCE

(71) Applicant: QUALCOMM Incorporated, San Diego, CA (US)

(72) Inventors: Umesh Phuyal, San Diego, CA (US); Bharat Shrestha, San Diego, CA (US); Mungal Singh Dhanda, Slough (GB); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/303,386

(22) Filed: May 27, 2021

(65) Prior Publication Data
US 2021/0377977 A1    Dec. 2, 2021

Related U.S. Application Data

(60) Provisional application No. 63/031,138, filed on May 28, 2020.

(51) Int. Cl.
H04W 72/1268 (2023.01)
H04W 74/04 (2009.01)
H04W 72/23 (2023.01)

(52) U.S. Cl.
CPC ....... *H04W 72/1268* (2013.01); *H04W 72/23* (2023.01); *H04W 74/04* (2013.01)

(58) Field of Classification Search
CPC .. H04W 72/1268; H04W 74/04; H04W 72/14
See application file for complete search history.

(56) References Cited

U.S. PATENT DOCUMENTS

2020/0107396 A1* 4/2020 Wang ................... H04W 72/14

FOREIGN PATENT DOCUMENTS

WO    WO-2020034571 A1    2/2020

OTHER PUBLICATIONS

Huawei, et al., "Handling of D-PUR Configuration for CP Solution", 3GPP Draft, 3GPP TSG-RAN WG2 Meeting #107bis, R2-1912610, Handling of D-PUR Configuration for CP Solution, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), XP051804564, pp. 1-7, Retrieved from the Internet: URL: https://ftp.3gpp.org/tsg_ran/WG2_RL2/TSGR2_107bis/Docs/R2-1912610.zip. R2-1912610 Handling of D-PUR configuration for CP solution.doc [retrieved on Oct. 4, 2019], the whole document.

(Continued)

*Primary Examiner* — Saad A. Waqas
(74) *Attorney, Agent, or Firm* — Harrity & Harrity, LLP

(57) ABSTRACT

Various aspects of the present disclosure generally relate to wireless communication. In some aspects, a user equipment (UE) may determine information indicating an association between the UE and a preconfigured uplink resource (PUR). The UE may transmit a message including the information indicating the association between the UE and the PUR. A base station may receive the message including the information indicating the association between the UE and the PUR. The base station may identify the UE associated with the PUR based at least in part on the information indicating the association between the UE and the PUR. Numerous other aspects are provided.

30 Claims, 7 Drawing Sheets

(56) References Cited

OTHER PUBLICATIONS

Huawei: "Report of Email Discussion [Post109e#46] [NBIOT/EMTC] PUR Open Issues", 3GPP Draft, 3GPP TSG-RAN WG2 Meeting#109bis-e, R2-2003746, 3rd Generation Partnership Project (3GPP), Mobile Competence Centre, 650, Route Des Lucioles, F-06921 Sophia-Antipolis Cedex, France, vol. RAN WG2, No. Online Meeting, Apr. 20, 2020-Apr. 30, 2020, Apr. 17, 2020 (Apr. 17, 2020), XP051876579, pp. 1-36, Retrieved from the Internet: URL: https://ftp.3gpp.org/tsg_ran/WG2_RL2/TSGR2_109bis-e/Docs/R2-2003746.zip. R2-2003746 Report of [Post109e#46] [NBIOTEMTC] PUR open issues.doc [retrieved on Apr. 17, 2020] p. 12-p. 17, the whole document.
International Search Report and Written Opinion—PCT/US2021/070637—ISA/EPO—dated Oct. 20, 2021.
ZTE Corporation, et al., "Issue of D-PUR Reconfiguration and Release for CP Solution", 3GPP Draft, R2-1914717, 3GPP TSG-RAN WG2 #108, 3rd Generation Partnership Project (3GPP), Mobile Competence Centre, 650, Route Des Lucioles, F-06921 Sophia-Antipolis Cedex, France, vol. RAN WG2. No. Reno. Nevada. USA, Nov. 18, 2019-Nov. 22, 2019, Nov. 8, 2019 (Nov. 8, 2019), XP051816718, 3 Pages, Retrieved from the Internet: URL:https://ftp.3gpp.org/tsg_ran/WG2_RL2/TSGR2_108/Docs/R2-1914717.zip R2-1914717 Issue of D-PUR Reconfiguration and Release for CP Solution.docx [retrieved on Nov. 8, 2019] the Whole Document.

\* cited by examiner

IDENTIFYING A USER EQUIPMENT ASSOCIATED WITH A PRE-CONFIGURED UPLINK RESOURCE

CROSS-REFERENCE TO RELATED APPLICATION

This Patent Application claims priority to U.S. Provisional Patent Application No. 63/031,138, filed on May 28, 2020, entitled "IDENTIFYING A USER EQUIPMENT ASSOCIATED WITH A CONTROL PLANE PRE-CONFIGURED UPLINK RESOURCE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for identifying a user equipment (UE) associated with a pre-configured uplink resource (PUR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include determining information indicating an association between the UE and a preconfigured uplink resource (PUR); and transmitting a message including the information indicating the association between the UE and the PUR.

In some aspects, a method of wireless communication, performed by a base station, may include receiving a message including information indicating an association between a UE and the PUR; and identifying the UE associated with the PUR based at least in part on the information indicating the association between the UE and the PUR.

In some aspects, a method of wireless communication, performed by a base station, may include transmitting, to a UE, a message including a PUR configuration, wherein the message including the PUR configuration does not include information indicating an association between the UE and the PUR configuration; and configuring the UE to transmit a request to release a PUR or a request to reconfigure the PUR using only an uplink resource configured based on the PUR when an identifier of the UE that was used to establish a radio resource control connection prior to the transmitting of the message including the PUR configuration is modified.

In some aspects, a method of wireless communication, performed by a user equipment, may include receiving, from a base station, a message including a PUR configuration, wherein the message including the PUR configuration does not include information indicating an association between the UE and the PUR configuration; determining that an identifier of the UE that was used to establish a radio resource control connection prior to the receiving of the message including the PUR configuration was modified; and transmitting a request to release a PUR or a request to reconfigure the PUR using only an uplink resource configured based on the PUR based at least in part on the determining.

In some aspects, a UE for wireless communication may include memory and one or more processors coupled to the memory. For example, the one or more processors may be operatively, electronically, communicatively, or otherwise coupled to the memory. The memory may include instructions executable by the one or more processors to cause the user equipment to determine information indicating an association between the UE and a PUR; and transmit a message including the information indicating the association between the UE and the PUR.

In some aspects, a base station for wireless communication may include memory and one or more processors coupled to the memory. For example, the one or more processors may be operatively, electronically, communicatively, or otherwise coupled to the memory. The memory may include instructions executable by the one or more processors to cause the base station to receive a message including information indicating an association between a UE and the PUR; and identify the UE associated with the PUR based at least in part on the information indicating the association between the UE and the PUR.

In some aspects, a base station for wireless communication may include memory and one or more processors coupled to the memory. For example, the one or more processors may be operatively, electronically, communicatively, or otherwise coupled to the memory. The memory may include instructions executable by the one or more processors to cause the base station to transmit, to a UE, a message including a PUR configuration, wherein the message including the PUR configuration does not include information indicating an association between the UE and the PUR configuration; and configure the UE to transmit a request to release a PUR or a request to reconfigure the PUR using only an uplink resource configured based on the PUR when an identifier of the UE that was used to establish a radio resource control connection prior to the transmitting of the message including the PUR configuration is modified.

In some aspects, a UE for wireless communication may include memory and one or more processors coupled to the memory. For example, the one or more processors may be operatively, electronically, communicatively, or otherwise coupled to the memory. The memory may include instructions executable by the one or more processors to cause the user equipment to receive, from a base station, a message including a PUR configuration, wherein the message including the PUR configuration does not include information indicating an association between the UE and the PUR configuration; determine that an identifier of the UE that was used to establish a radio resource control connection prior to the receiving of the message including the PUR configuration was modified; and transmit a request to release a PUR or a request to reconfigure the PUR using only an uplink resource configured based on the PUR based at least in part on the determining.

In some aspects, a non-transitory computer-readable medium may store one or more instructions for wireless communication. The one or more instructions, when executed by one or more processors of a UE, may cause the UE to determine information indicating an association between the UE and a PUR; and transmit a message including the information indicating the association between the UE and the PUR.

In some aspects, a non-transitory computer-readable medium may store one or more instructions for wireless communication. The one or more instructions, when executed by one or more processors of a base station, may cause the base station to receive a message including information indicating an association between a UE and the PUR; and identify the UE associated with the PUR based at least in part on the information indicating the association between the UE and the PUR.

In some aspects, a non-transitory computer-readable medium may store one or more instructions for wireless communication. The one or more instructions, when executed by one or more processors of a base station, may cause the base station to transmit, to a UE, a message including a PUR configuration, wherein the message including the PUR configuration does not include information indicating an association between the UE and the PUR configuration; and configure the UE to transmit a request to release a PUR or a request to reconfigure the PUR using only an uplink resource configured based on the PUR when an identifier of the UE that was used to establish a radio resource control connection prior to the transmitting of the message including the PUR configuration is modified.

In some aspects, a non-transitory computer-readable medium may store one or more instructions for wireless communication. The one or more instructions, when executed by one or more processors of a UE, may cause the UE to receive, from a base station, a message including a PUR configuration, wherein the message including the PUR configuration does not include information indicating an association between the UE and the PUR configuration; determine that an identifier of the UE that was used to establish a radio resource control connection prior to the receiving of the message including the PUR configuration was modified; and transmit a request to release a PUR or a request to reconfigure the PUR using only an uplink resource configured based on the PUR based at least in part on the determining.

In some aspects, an apparatus for wireless communication may include means for determining information indicating an association between the apparatus and a PUR; and means for transmitting a message including the information indicating the association between the apparatus and the PUR.

In some aspects, an apparatus for wireless communication may include means for receiving a message including information indicating an association between a UE and the PUR; and means for identifying the UE associated with the PUR based at least in part on the information indicating the association between the UE and the PUR.

In some aspects, an apparatus for wireless communication may include means for transmitting, to a UE, a message including a PUR configuration, wherein the message including the PUR configuration does not include information indicating an association between the UE and the PUR configuration; and means for configuring the UE to transmit a request to release a PUR or a request to reconfigure the PUR using only an uplink resource configured based on the PUR when an identifier of the UE that was used to establish a radio resource control connection prior to the transmitting of the message including the PUR configuration is modified.

In some aspects, an apparatus for wireless communication may include means for receiving, from a base station, a message including a PUR configuration, wherein the message including the PUR configuration does not include information indicating an association between the apparatus and the PUR configuration; means for determining that an identifier of the UE that was used to establish a radio resource control connection prior to the receiving of the message including the PUR configuration was modified; and means for transmitting a request to release a PUR or a request to reconfigure the PUR using only an uplink resource configured based on the PUR based at least in part on the determining.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
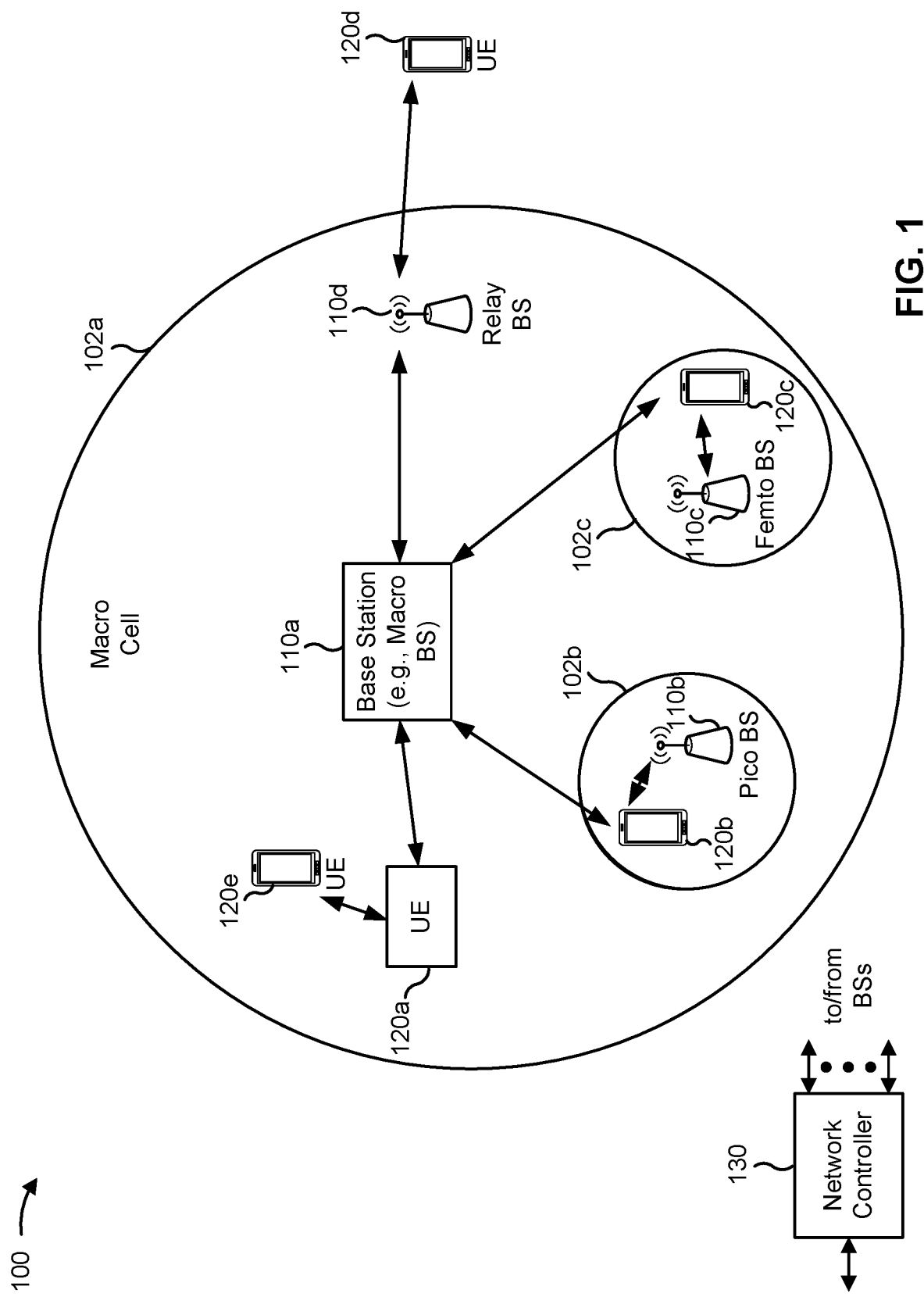
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. MTC or IoT UEs may include eMTC (also referred to as CAT-M, or Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT). Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
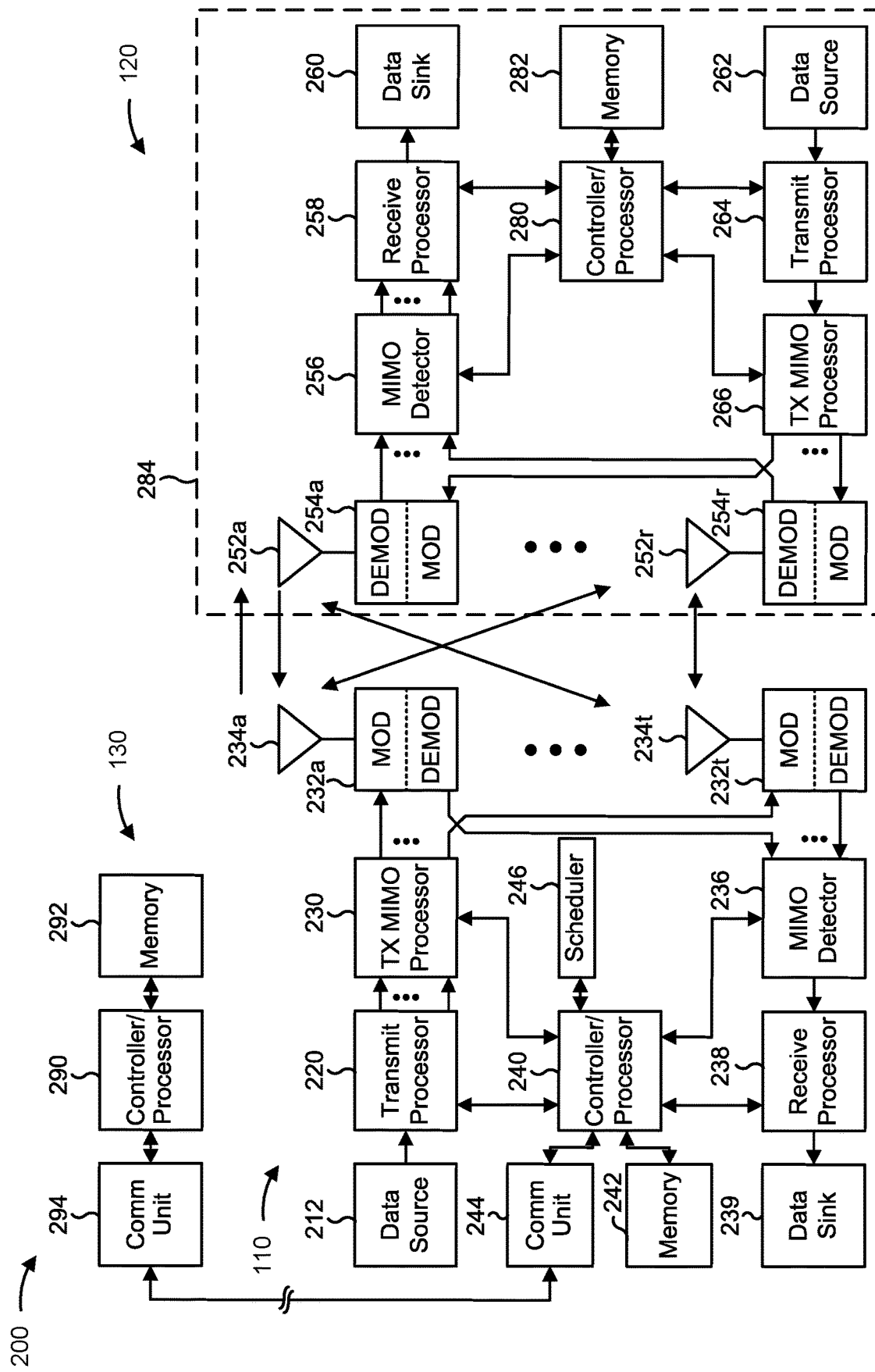
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with identifying a UE associated with a PUR, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for determining information indicating an association between the UE 120 and a preconfigured uplink resource (PUR); means for transmitting a message including the information indicating the association between the UE and the PUR; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving, from a base station 110, a message including a PUR configuration, wherein the message including the PUR configuration does not include information indicating an association between the UE 120 and the PUR configuration; means for determining that an identifier of the UE that was used to establish a radio resource control connection prior to the receiving of the message including the PUR configuration was modified; transmitting a request to release a PUR or a request to reconfigure the PUR using only an uplink resource configured based on the PUR based at least in part on the determining; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving a message including information indicating an association between a UE 120 and the PUR; means for identifying the UE 120 associated with the PUR based at least in part on the information indicating the association between the UE and the PUR; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for transmitting, to a UE 120, a message including a PUR configuration, wherein the message including the PUR configuration does not include information indicating an association between the UE 120 and the PUR configuration; means for configuring the UE 120 to transmit a request to release a PUR or a request to reconfigure the PUR using only an uplink resource configured based on the PUR when an identifier of the UE 120 that was used to establish a radio resource control connection prior to the transmitting of the message including the PUR configuration is modified; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Some wireless communication systems, such as an NR or an LTE system, including an eMTC or an NB-IoT system, may be designed to permit a UE (e.g., a UE 120) to transmit uplink data during the random access procedure by shortening the random access procedure, such as omitting first and second messages and transmitting uplink data in a third message of a random access procedure (e.g., msg3 of a four-step random access procedure). In such a case, the UE may transmit the uplink data in an uplink resource that was previously configured on the UE by the network (e.g., by a base station 110). The uplink resource that is preconfigured for the UE to permit this shortening of the random access procedure and transmission of uplink data is herein referred to as a PUR.

In general, a UE in radio resource control (RRC) idle mode that has a valid timing advance (TA) (e.g., a stationary UE) may utilize a PUR. Notably, a PUR is a grant-free approach to UL data transmission that can improve uplink transmission efficiency and power consumption for, for example, an enhanced machine type communication (eMTC) UE, a narrowband Internet-of-things (NB-IoT) UE, or the like. PURs can be used for transmission of both user plane data and control plane data using user plane consumer IoT EPS/5GS optimization and control plane consumer IoT EPS/5GS optimization, which is referred to as transmission using user plane PUR and transmission using control plane PUR respectively. PUR can be contention-free dedicated (D-PUR), contention-free shared (CFS-PUR) or contention-based shared (CBS-PUR). Notably, an applicable wireless communication standard may not differentiate between D-PUR and CFS-PUR, meaning that it is up to the network (e.g., a base station 110) to determine whether a given resource (e.g., a time/frequency resource) is configured to one UE or to multiple to UEs (with different DMRS cyclic shifts for resolving contention).

In operation, to be configured with a PUR, a UE may transmit a message including a request to be configured with a PUR. The UE may transmit the message to a base station while the UE is in an RRC connected mode. Notably, the same message can be used to request a release of the PUR, as described below. The base station may receive the request and provide a PUR configuration to the UE, the PUR configuration including information associated with a PUR allocated for the UE. Notably, in some cases, the base station may provide the UE with the PUR configuration without a request from the UE. The PUR configuration may be provided to the UE in, for example, an RRC connection release message. The UE may receive the PUR configuration, and may then use the PUR for uplink data transmission in the manner described above. After configuration of the PUR, the UE may decide to skip one or more PUR occasions (e.g., when the UE does not have any uplink data to transmit in the PUR). In such a case, the UE may transmit a message to a base station (while the UE is in an RRC connected mode) including a request to release the PUR. However, the message including the request to release the PUR does not include any specific information associated with the PUR, which can be problematic in the case of a PUR.

For example, a base station may configure a first UE with a first PUR and a second UE with a second PUR, and the first UE and the second UE may be operating in RRC idle mode. The second UE may trigger an RRC connection (e.g., to switch from RRC idle mode to RRC connected mode) and, during establishment of the RRC connection, may transmit a message including a PUR release request. Thereafter, the second UE may skip a PUR occasion, associated with the second PUR, that occurs during establishment of the RRC connection. In this example, the first UE decides to skip a PUR occasion, associated with the first PUR, that occurs during establishment of the RRC connection by the second UE. Here, the base station may receive the PUR release request from the second UE, but if an identifier of the second UE (e.g., a system architecture evolution temporary mobile subscriber identity (S-TMSI)) has been modified since the second UE was configured with the second PUR, the base station is unable to identify which PUR (the first PUR associated with the first UE or the second PUR associated with the second UE) is to be released (e.g., since the PUR release request does not include any specific information associated with the second PUR). As a result, the base station may mistakenly release the first PUR in response to the PUR release request provided by the second UE. Further, in a case in which the PUR is shared between the first and second UEs (e.g., if the first and second PURs are the same CFS-PUR) the base station will be unable to identify the UE for which the release should be performed even if the base station is able to identify the PUR to be released.

Some aspects described herein provide techniques and apparatuses for identifying a UE associated with a PUR. In some aspects, a UE may determine information indicating an association between the UE and a PUR, and may transmit a message including the information indicating the association between the UE and the PUR. In some aspects, the base station may receive the message including the information indicating the association between the UE and the PUR, may identify the UE associated with the PUR based at least in part on the information indicating the association between the UE and the PUR, and may proceed accordingly (e.g., release the PUR, reconfigure the PUR, or the like). Additional details are provided below.

Figure 3:
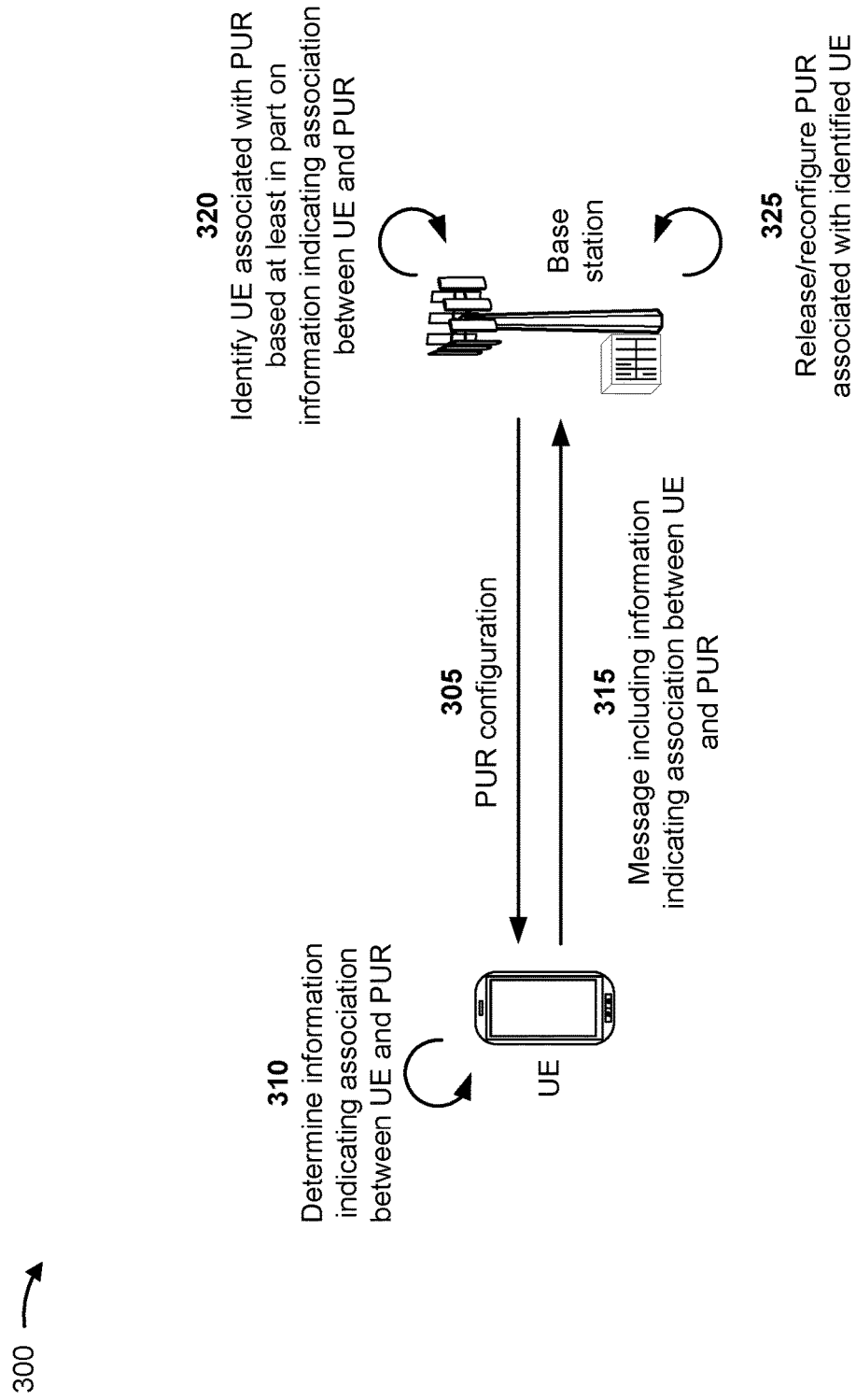
FIG. 3 is a diagram illustrating an example associated with identifying a UE associated with a pre-configured uplink resource (PUR), in accordance with the present disclosure.

FIG. 3 is a diagram illustrating an example 300 associated with identifying a UE associated with a PUR, in accordance with the present disclosure.

As shown by reference 305, a base station (e.g., a base station 110) may transmit, and a UE (e.g., a UE 120) may receive, a PUR configuration. The PUR configuration may include information associated with a PUR that may be used by the UE for transmitting uplink data (e.g., when the UE is operating in RRC idle mode). For example, the PUR configuration may include information that identifies one or more time/frequency resources that can be used by the UE for transmitting uplink data (e.g., while the UE is in RRC idle mode). In some aspects, the PUR associated with the PUR configuration may be a D-PUR. In some aspects, the PUR associated with the PUR configuration may be a CFS-PUR.

In some aspects, the PUR configuration may be transmitted by the base station, and received by the UE, in an RRC connection release message.

In some aspects, the base station may transmit the PUR configuration based at least in part on a UE request. For example, the UE (e.g., while operating in RRC connected mode) may transmit a PUR message including a request to be configured with a PUR. The base station may receive the PUR message including the request, and may transmit the PUR configuration to the UE based at least in part on the request. Additionally, or alternatively, the base station may transmit the PUR configuration to the UE without a request from the UE (e.g., the base station may transmit the PUR configuration to the UE based at least in part on a configuration or implementation of the base station, based at least in part on an indication from another wireless communication device, or the like). In some aspects, the PUR configuration may include information indicating an association between the UE and the PUR. Additional details regarding the information indicating the association between the UE and the PUR are described below.

In some aspects, the UE may decide to request a release of the PUR or a reconfiguration of the PUR. For example, the UE may decide to request a release of the PUR when the UE has triggered an RRC connection (e.g., to switch from RRC idle mode to RRC connected mode). As another example, the UE may decide to request a reconfiguration of the PUR when the UE needs additional uplink resources, is unable to use the resources as configured based on the PUR, or the like.

As shown by reference 310, the UE may determine information indicating an association between the UE and the PUR and, as shown by reference 315, may transmit a message including the information indicating the association between the UE and the PUR (e.g., pur-ConfigID-r16). In some implementations, the message may be an RRC message, such as an RRC connection setup complete message. In some implementations (e.g., when the UE has decided to request a release of the PUR or a reconfiguration of the PUR), the message may include a request to release the PUR or a request to reconfigure the PUR. Here, the message may include the information indicating the association between the UE and the PUR. In some aspects, the UE may determine the information indicating the association between the UE and the PUR and transmit the message based at least in part on a decision to request the release or the reconfiguration of the PUR.

In some aspects, the information indicating the association between the UE and the PUR includes a PUR radio network temporary identifier (RNTI). For example, in some aspects, the PUR configuration provided by the base station and received by the UE may include the PUR RNTI. In some aspects, if the PUR RNTI is unique across all UEs associated with the base station, then PUR RNTI may be used by the base station to identify the UE and thus the associated PUR configuration.

In some aspects, the information indicating the association between the UE and the PUR may include at least a portion of an identifier of the UE at a time at which the PUR was configured or last reconfigured. For example, the information indicating the association between the UE and the PUR may include at least a portion of an S-TMSI (e.g., a full S-TMSI, a portion of the S-TMSI, a truncated S-TMSI, or the like), associated with the UE, that was used to establish an RRC connection prior to the PUR configuration being received by the UE. In some aspects, the UE may store the identifier of the UE based at least in part on the identifier of the UE being modified after the time at which the PUR was configured or reconfigured. For example, the UE may be configured with a first S-TMSI at a time at which the PUR is configured for the UE. After configuration of the PUR, the UE may be reconfigured with a second (different) S-TMSI. Here, upon modification of the S-TMSI (i.e., upon configuration of the second S-TMSI), the UE may store the first S-TMSI. In this example, the UE may include the first S-TMSI in the message when requesting the release or reconfiguration of the PUR (e.g., since the PUR may be tagged with the first S-TMSI at the base station).

In some aspects, the information indicating the association between the UE and the PUR may include a PUR RNTI associated with the UE and a RNTI resolution identifier associated with the UE (e.g., a combination of a PUR RNTI associated with the UE and a RNTI resolution identifier associated with the UE). For example, in some aspects, the PUR configuration provided by the base station and received by the UE may include the PUR RNTI and a RNTI resolution identifier. In some aspects, the RNTI resolution identifier may include one or more bits (e.g., four to eight bits). In some aspects, if the PUR RNTI is not unique across all UEs associated with the base station, then RNTI resolution identifier, when combined with PUR RNTI, may be used by the base station to identify the UE and thus the associated PUR configuration. In some aspects, the PUR RNTI may have a size of 16 bits, meaning that a relatively small number of bits (e.g., four to eight bits) are needed for the RNTI resolution identifier (e.g., since a combination of the PUR RNTI and the RNTI resolution identifier would be 20 to 24 bits, which enables approximately 1 million to 16 million unique identifiers).

In some aspects, the information indicating the association between the UE and the PUR may include only the RNTI resolution identifier associated with the UE. For example, in some aspects, the PUR configuration provided by the base station and received by the UE may include the RNTI resolution identifier. In some aspects, the RNTI resolution identifier may include approximately 20 bits. In some aspects, if the RNTI resolution identifier is unique across all UEs associated with the base station, then RNTI resolution identifier may be used by the base station to identify the UE and thus the associated PUR configuration. In some aspects, use of such a RNTI resolution identifier renders inclusion of the PUR RNTI in the PUR configuration optional.

In some aspects, the information indicating the association between the UE and the PUR may include a PUR identifier associated with the UE. For example, in some aspects, the PUR configuration provided by the base station and received by the UE may include the PUR identifier. In some aspects, the PUR identifier may include multiple bits (e.g., 10 bits) and may be unique for each PUR configuration in a given cell. In some aspects, if the PUR identifier may be used by the base station to identify the UE and thus the associated PUR configuration.

In some aspects, the information indicating the association between the UE and the PUR may include information associated with a grant associated with the PUR configuration. The information associated with the grant may include, for example, information that identifies time/frequency resources associated with the grant. In some aspects, the information associated with the grant may include partial information associated with the grant. For example, the information associated with the grant may include the information that identifies time/frequency resources associated with the grant, but may not include a modulation and coding scheme (MCS) associated with the grant. In some aspects, the information associated with the grant may include information that identifies a DMRS cyclic shift (e.g., to resolve ambiguity in the case of a CFS-PUR). In some aspects, the UE may calculate a hash of the information associated with the grant, and may include the hash in the message (e.g., to prevent a UE from attempting to release a PUR of another).

In some aspects, the UE may include the information indicating the association between the UE and the PUR (e.g., pur-ConfigID-r16) in the message based at least in part on a determination that an identifier of the UE (e.g., S-TMSI) has been modified since a time at which the PUR was configured or last reconfigured. For example, the UE may be configured with a first S-TMSI at a time at which the PUR is configured for the UE. After or prior to transmitting the downlink message containing the configuration of the PUR, the UE may be reconfigured with a second (different) S-TMSI. Here, upon modification of the S-TMSI (i.e., upon configuration of the second S-TMSI), the UE may set a flag indicating that the S-TMSI has been modified since configuration of the PUR. In this example, when preparing the message, the UE may check the flag and determine that the S-TMSI has been modified since configuration of the PUR. Based at least in part on this determination, the UE may then include the information indicating the association between the UE (e.g., the PUR RNTI, the first S-TMSI, the PUR RNTI and the RNTI resolution identifier, the PUR identifier, or the information associated with the grant) in the message requesting the release or reconfiguration of the PUR.

As indicated by reference 315, the base station may receive the message including the information indicating an association between the UE and the PUR. As shown by reference 320, the base station may identify the UE associated with the PUR based at least in part on the information indicating the association between the UE and the PUR.

In some aspects, as indicated by reference 325, the base station may release the PUR. For example, the base station may receive a PUR message including a request to release the PUR, and release the PUR based at least in part on identifying the UE associated with the PUR as described above with respect to the reference 320.

In some aspects, as indicated by reference 325, the base station may reconfigure the PUR. For example, the base station may receive the a PUR message including a request to reconfigure the PUR, and reconfigure the PUR based at least in part on identifying the UE associated with the PUR as described above with respect to the reference 320.

As an alternative to the above aspects, in some aspects, the base station may transmit, to the UE, a message including a PUR configuration, where the message does not include information indicating an association between the UE and the PUR configuration. In this context, the PUR configuration may include an initial configuration of a PUR (i.e., the message may be associated with initially configuring a PUR) or a reconfiguration of a PUR (i.e., the message may be associated with reconfiguring a previously configured PUR). In such a case, the UE may be configured (e.g., based at least in part on an indication provided by the base station, based at least in part on an applicable wireless communication standard, or the like) to refrain from transmitting a request to release the PUR or a request to reconfigure the PUR without using the PUR when an identifier of the UE (e.g., an S-TMSI that was used to establish an RRC connection prior to the transmitting of the message including the PUR configuration) is modified. In other words, the UE may be configured (e.g., based at least in part on an indication provided by the base station, based at least in part on an applicable wireless communication standard, or the like) to transmit a request to release the PUR or a request to reconfigure the PUR using only an uplink resource configured based on the PUR. For example, the base station may tag the PUR configuration with the identifier of the UE (e.g., the S-TMSI at the time of the PUR configuration) and, when transmitting the PUR configuration, may not include information indicating an association between the UE and the PUR (e.g., a PUR RNTI, a RNTI resolution identifier, a PUR identifier, or the like) in the PUR configuration. Here, the UE may be configured (e.g., based at least in part on an indication provided by the base station, based at least in part on an applicable wireless communication standard, or the like) such that, upon receiving a PUR configuration that does not include information indicating an association between the UE and the PUR, the UE will not transmit a message including a request to release or reconfigure the PUR configuration without using the PUR if the S-TMSI is modified. Otherwise (i.e., if the S-TMSI is not modified), then the UE may be permitted to request release or reconfiguration of the PUR without using the PUR. In some aspects, the base station may explicitly configure the UE to refrain from transmitting a request to release the PUR or a request to reconfigure the PUR when the information identifying the association between the UE and the PUR is not included in the PUR configuration message. Additionally, or alternatively, the UE may be implicitly configured (e.g., based at least in part on an applicable wireless communication standard) to refrain from transmitting a request to release the PUR or a request to reconfigure the PUR when the information identifying the association between the UE and the PUR is not included in the PUR configuration message.

As indicated above, FIG. 3 is provided as an example. Other examples may differ from what is described with respect to FIG. 3.

Figure 4:
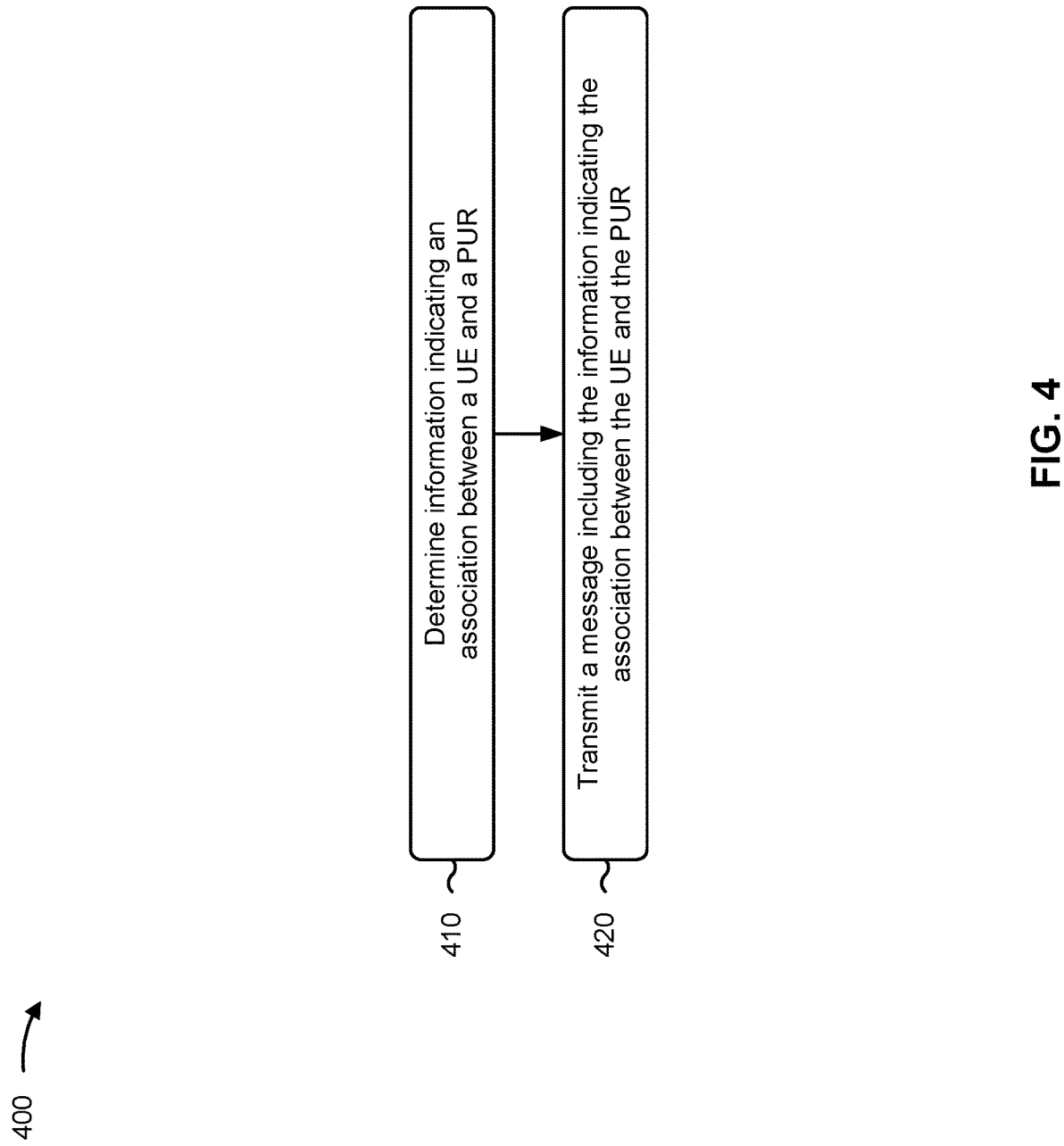
FIGS. 4-7 are diagrams illustrating example processes associated with identifying a UE associated with a PUR, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with identifying a UE associated with a PUR.

As shown in FIG. 4, in some aspects, process 400 may include determining information indicating an association between the UE and a PUR (block 410). For example, the UE (e.g., using receive processor 258, transmit processor 264, controller/processor 280, memory 282, and/or the like) may determine information indicating an association between the UE and a PUR, as described above.

As further shown in FIG. 4, in some aspects, process 400 may include transmitting a message including the information indicating the association between the UE and the PUR (block 420). For example, the UE (e.g., using receive processor 258, transmit processor 264, controller/processor 280, memory 282, and/or the like) may transmit a message including the information indicating the association between the UE and the PUR, as described above. In some implementations, the message may include a request to release the PUR or a request to reconfigure the PUR. In some implementations, the message may be an RRC message.

Process 400 may include additional aspects, such as any single aspect or any combination of aspects described below and/or in connection with one or more other processes described elsewhere herein.

In a first aspect, the information indicating the association between the UE and the PUR is included in the message based at least in part on a determination that an identifier of the UE has been modified since a time at which the PUR was configured or reconfigured.

In a second aspect, alone or in combination with the first aspect, the identifier of the UE includes a system architecture evolution temporary mobile subscriber identity, associated with the UE, that was used to establish a radio resource control connection prior to a PUR configuration, associated with the PUR, being received by the UE.

In a third aspect, alone or in combination with one or more of the first and second aspects, the information indicating the association between the UE and the PUR is received in a PUR configuration associated with the PUR.

In a fourth aspect, alone or in combination with one or more of the first through third aspects, the PUR configuration is received based at least in part on a PUR request transmitted by the UE.

In a fifth aspect, alone or in combination with one or more of the first through fourth aspects, the PUR is a contention-free dedicated PUR.

In a sixth aspect, alone or in combination with one or more of the first through fifth aspects, the PUR is a contention-free shared PUR.

In a seventh aspect, alone or in combination with one or more of the first through sixth aspects, the information indicating the association between the UE and the PUR includes a PUR RNTI.

In an eighth aspect, alone or in combination with one or more of the first through seventh aspects, the information indicating the association between the UE and the PUR includes at least a portion of an identifier of the UE at a time at which the PUR was configured or reconfigured.

In a ninth aspect, alone or in combination with one or more of the first through eighth aspects, the identifier of the UE includes a system architecture evolution temporary mobile subscriber identity, associated with the UE, that was used to establish a radio resource control connection prior to a PUR configuration, associated with the PUR, being received by the UE.

In a tenth aspect, alone or in combination with one or more of the first through ninth aspects, process 400 includes storing the identifier of the UE based at least in part on the identifier of the UE being modified after the time at which the PUR was configured or reconfigured.

In an eleventh aspect, alone or in combination with one or more of the first through tenth aspects, the information indicating the association between the UE and the PUR includes a combination of a PUR RNTI associated with the UE and a RNTI resolution identifier associated with the UE.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
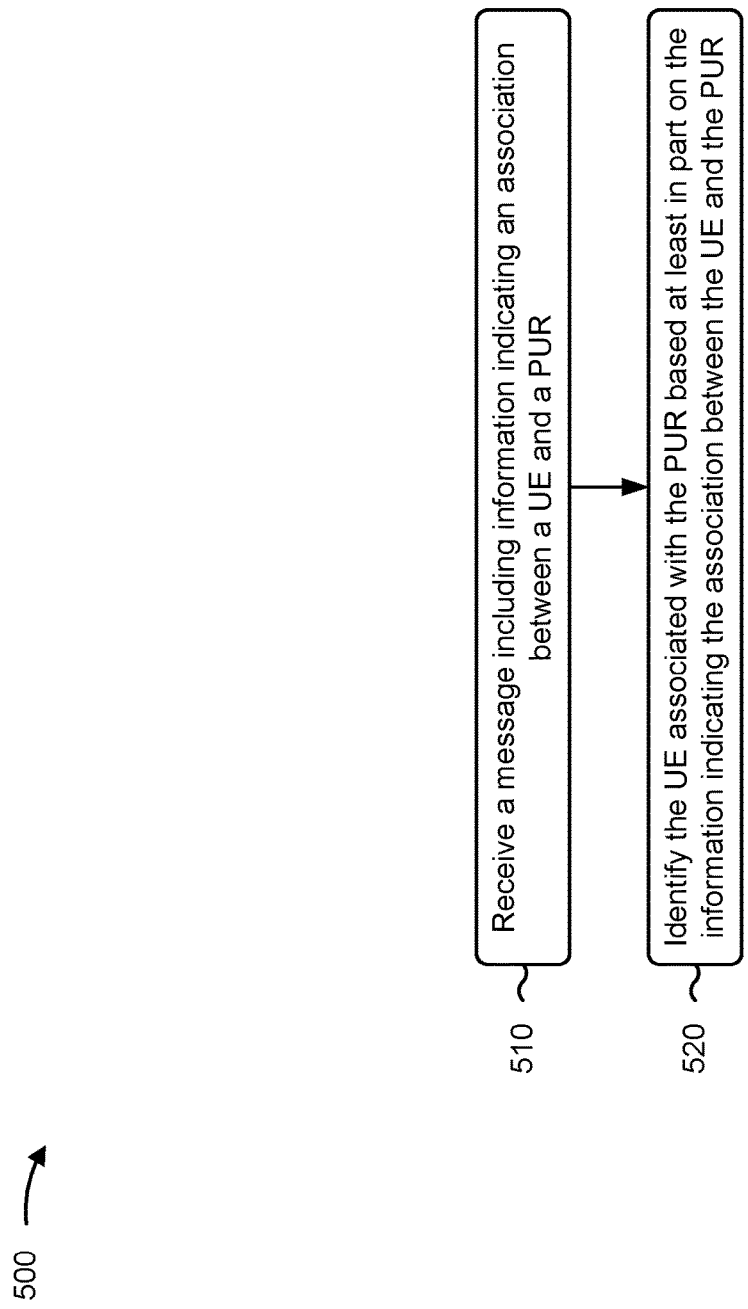

FIG. 5 is a diagram illustrating an example process 500 performed, for example, by a base station, in accordance with the present disclosure. Example process 500 is an example where the base station (e.g., base station 110 and/or the like) performs operations associated with identifying a UE associated with a PUR.

As shown in FIG. 5, in some aspects, process 500 may include receiving a message including information indicating an association between a UE and the PUR (block 510). For example, the base station (e.g., using transmit processor 220, receive processor 238, controller/processor 240, memory 242, and/or the like) may receive a message including information indicating an association between a UE and the PUR, as described above. In some implementations, the message may include a request to release a PUR or a request to reconfigure the PUR. In some implementations, the message may be an RRC message.

As further shown in FIG. 5, in some aspects, process 500 may include identifying the UE associated with the PUR based at least in part on the information indicating the association between the UE and the PUR (block 520). For example, the base station (e.g., using transmit processor 220, receive processor 238, controller/processor 240, memory 242, and/or the like) may identify the UE associated with the PUR based at least in part on the information indicating the association between the UE and the PUR, as described above.

Process 500 may include additional aspects, such as any single aspect or any combination of aspects described below and/or in connection with one or more other processes described elsewhere herein.

In a first aspect, the information indicating the association between the UE and the PUR is transmitted in a PUR configuration associated with the PUR.

In a second aspect, alone or in combination with the first aspect, the PUR configuration is transmitted based at least in part on a PUR request received from the UE.

In a third aspect, alone or in combination with one or more of the first and second aspects, the PUR is a contention-free dedicated PUR.

In a fourth aspect, alone or in combination with one or more of the first through third aspects, the PUR is a contention-free shared PUR.

In a fifth aspect, alone or in combination with one or more of the first through fourth aspects, the information indicating the association between the UE and the PUR includes a PUR RNTI.

In a sixth aspect, alone or in combination with one or more of the first through fifth aspects, the information indicating the association between the UE and the PUR includes at least a portion of an identifier of the UE at a time at which the PUR was configured or reconfigured.

In a seventh aspect, alone or in combination with one or more of the first through sixth aspects, the identifier of the UE includes a system architecture evolution temporary mobile subscriber identity, associated with the UE, that was used to establish a radio resource control connection prior to a PUR configuration, associated with the PUR, being received by the UE.

In an eighth aspect, alone or in combination with one or more of the first through seventh aspects, the information indicating the association between the UE and the PUR includes a combination of a PUR RNTI associated with the UE and a RNTI resolution identifier associated with the UE.

In a ninth aspect, alone or in combination with one or more of the first through eighth aspects, process 500 includes releasing the PUR when the message includes the request to release the PUR.

In a tenth aspect, alone or in combination with one or more of the first through ninth aspects, process 500 includes reconfiguring the PUR when the message includes the request to reconfigure the PUR.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
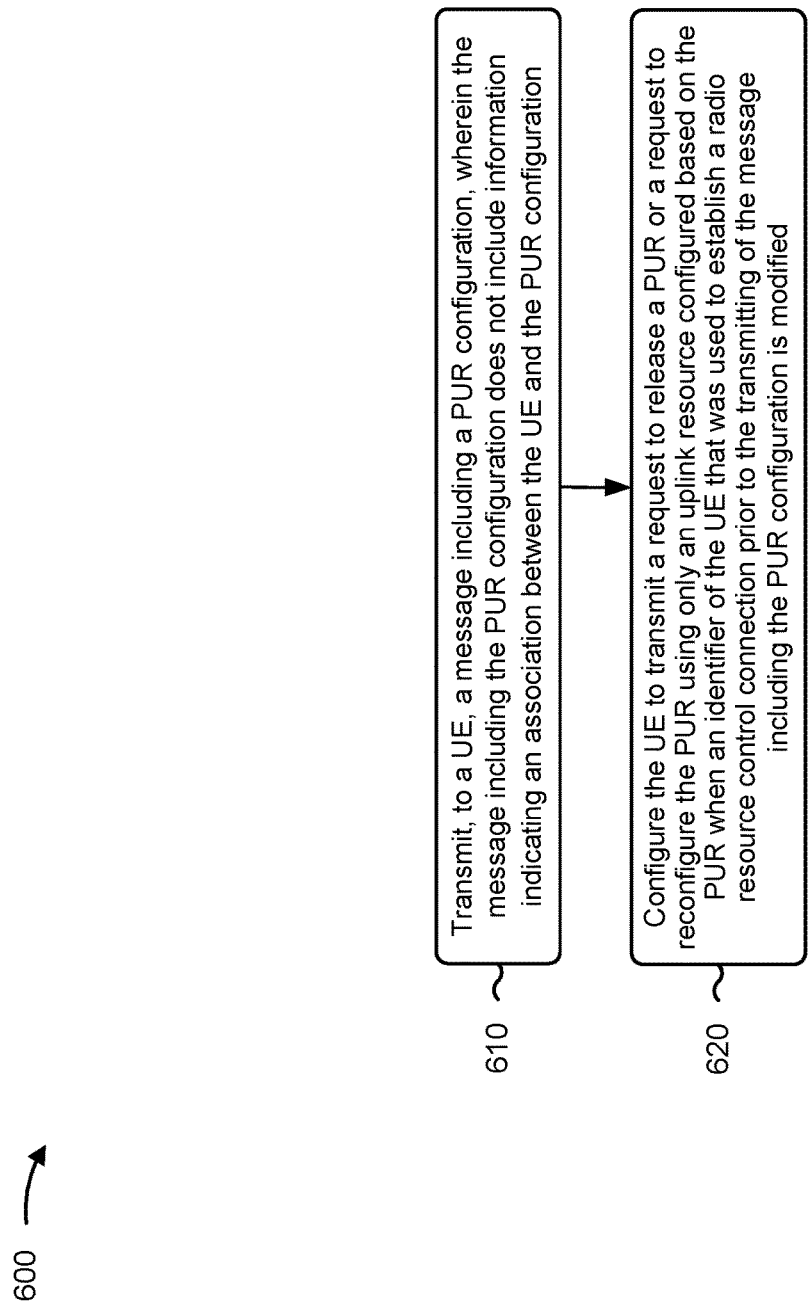

FIG. 6 is a diagram illustrating an example process 600 performed, for example, by a base station, in accordance with the present disclosure. Example process 600 is an example where the base station (e.g., base station 110 and/or the like) performs operations associated with identifying a UE associated with a PUR.

As shown in FIG. 6, in some aspects, process 600 may include transmitting, to a UE, a message including a PUR configuration, wherein the message including the PUR configuration does not include information indicating an association between the UE and the PUR configuration (block 610). For example, the base station (e.g., using transmit processor 220, receive processor 238, controller/processor 240, memory 242, and/or the like) may transmit, to a UE, a message including a PUR configuration, as described above. In some aspects, the message including the PUR configuration does not include information indicating an association between the UE and the PUR configuration.

As further shown in FIG. 6, in some aspects, process 600 may include configuring the UE to transmit a request to release a PUR or a request to reconfigure the PUR using only an uplink resource configured based on the PUR when an identifier of the UE that was used to establish a radio resource control connection prior to the transmitting of the message including the PUR configuration is modified (block 620). For example, the base station (e.g., using transmit processor 220, receive processor 238, controller/processor 240, memory 242, and/or the like) may configure the UE to transmit a request to release a PUR or a request to reconfigure the PUR using only an uplink resource configured based on the PUR when an identifier of the UE that was used to establish a radio resource control connection prior to the transmitting of the message including the PUR configuration is modified, as described above.

Process 600 may include additional aspects, such as any single aspect or any combination of aspects described below and/or in connection with one or more other processes described elsewhere herein.

In a first aspect, the identifier of the UE includes a system architecture evolution temporary mobile subscriber identity, associated with the UE, that was used to establish a radio resource control connection prior to the transmitting of the message including the PUR configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
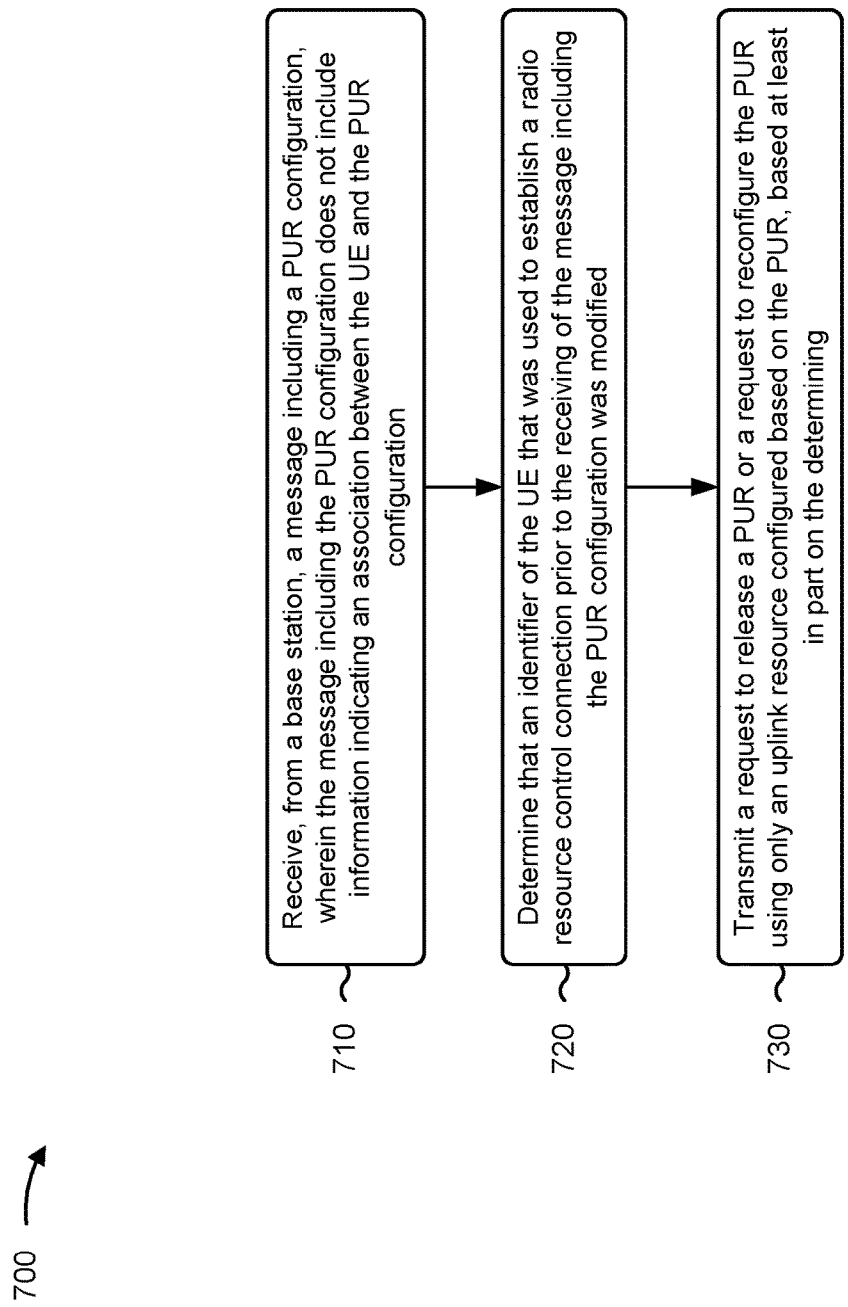

FIG. 7 is a diagram illustrating an example process 700 performed, for example, by a UE, in accordance with the present disclosure. Example process 700 is an example where the UE (e.g., UE 120 and/or the like) performs operations associated with identifying a user equipment associated with a PUR.

As shown in FIG. 7, in some aspects, process 700 may include receiving, from a base station, a message including a PUR configuration, wherein the message including the PUR configuration does not include information indicating an association between the UE and the PUR configuration (block 710). For example, the UE (e.g., using receive processor 258, transmit processor 264, controller/processor 280, memory 282, and/or the like) may receive, from a base station, a message including a PUR configuration, as described above. In some aspects, the message including the PUR configuration does not include information indicating an association between the UE and the PUR configuration.

As further shown in FIG. 7, in some aspects, process 700 may include determining that an identifier of the UE that was used to establish a radio resource control connection prior to the receiving of the message including the PUR configuration was modified (block 720). For example, the UE (e.g., using receive processor 258, transmit processor 264, controller/processor 280, memory 282, and/or the like) may determining that an identifier of the UE that was used to establish a radio resource control connection prior to the receiving of the message including the PUR configuration was modified, as described above.

As further shown in FIG. 7, in some aspects, process 700 may include transmitting a request to release the PUR or a request to reconfigure a PUR using only uplink resources configured based on the PUR based at least in part on the determining (block 730). For example, the UE (e.g., using receive processor 258, transmit processor 264, controller/processor 280, memory 282, and/or the like) may transmit a request to release a PUR or a request to reconfigure the PUR using only uplink resources configured based on the PUR based at least in part on the determining, as described above.

Process 700 may include additional aspects, such as any single aspect or any combination of aspects described below and/or in connection with one or more other processes described elsewhere herein.

In a first aspect, the identifier of the UE includes a system architecture evolution temporary mobile subscriber identity, associated with the UE, that was used to establish a radio resource control connection prior to the receiving of the message including the PUR configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a UE, comprising: determining information indicating an association between the UE and a PUR; and transmitting a message including the information indicating the association between the UE and the PUR.

Aspect 2: The method of Aspect 1, wherein the information indicating the association between the UE and the PUR is included in the message based at least in part on a determination that an identifier of the UE has been modified since a time at which the PUR was configured or reconfigured.

Aspect 3: The method of any of Aspects 1-2, wherein the identifier of the UE includes a system architecture evolution temporary mobile subscriber identity, associated with the UE, that was used to establish a radio resource control connection prior to a PUR configuration, associated with the PUR, being received by the UE.

Aspect 4: The method of any of Aspects 1-3, wherein the information indicating the association between the UE and the PUR is received in a PUR configuration associated with the PUR.

Aspect 5: The method of Aspect 4, wherein the PUR configuration is received based at least in part on a PUR request transmitted by the UE.

Aspect 6: The method any of Aspects 1-5, wherein the PUR is a contention-free dedicated PUR.

Aspect 7: The method of any of Aspects 1-5, wherein the PUR is a contention-free shared PUR.

Aspect 8: The method of any of Aspects 1-7, wherein the information indicating the association between the UE and the PUR includes a PUR radio network temporary identifier (RNTI).

Aspect 9: The method of any of Aspects 1-8, wherein the information indicating the association between the UE and the PUR includes at least a portion of an identifier of the UE at a time at which the PUR was configured or reconfigured.

Aspect 10: The method of Aspect 9, wherein the identifier of the UE includes a system architecture evolution temporary mobile subscriber identity, associated with the UE, that was used to establish a radio resource control connection prior to a PUR configuration, associated with the PUR, being received by the UE.

Aspect 11: The method of any of Aspects 9-10, further comprising storing the identifier of the UE based at least in part on the identifier of the UE being modified after the time at which the PUR was configured or reconfigured.

Aspect 12: The method of any of Aspects 1-11, wherein the information indicating the association between the UE and the PUR includes a combination of a PUR radio network temporary identifier (RNTI) associated with the UE and a RNTI resolution identifier associated with the UE.

Aspect 13: The method of any of Aspects 1-12, wherein the message includes a request to release the PUR or a request to reconfigure the PUR.

Aspect 14: The method of any of Aspects 1-13, wherein the message is a radio resource control message.

Aspect 15: A method of wireless communication performed by a base station, comprising: receiving a message including information indicating an association between a UE and a PUR; and identifying the UE associated with the PUR based at least in part on the information indicating the association between the UE and the PUR.

Aspect 16: The method of Aspect 15, wherein the information indicating the association between the UE and the PUR is transmitted in a PUR configuration associated with the PUR.

Aspect 17: The method of Aspect 16, wherein the PUR configuration is transmitted based at least in part on a PUR request received from the UE.

Aspect 18: The method of any of Aspects 15-17, wherein the PUR is a contention-free dedicated PUR.

Aspect 19: The method of any of Aspects 15-18, wherein the PUR is a contention-free shared PUR.

Aspect 20: The method of any of Aspects 15-19, wherein the information indicating the association between the UE and the PUR includes a PUR radio network temporary identifier (RNTI).

Aspect 21: The method of any of Aspects 15-20, wherein the information indicating the association between the UE and the PUR includes at least a portion of an identifier of the UE at a time at which the PUR was configured or reconfigured.

Aspect 22: The method of Aspect 21, wherein the identifier of the UE includes a system architecture evolution temporary mobile subscriber identity, associated with the UE, that was used to establish a radio resource control connection prior to a PUR configuration, associated with the PUR, being received by the UE.

Aspect 23: The method of any of Aspects 15-22, wherein the information indicating the association between the UE and the PUR includes a combination of a PUR RNTI associated with the UE and a RNTI resolution identifier associated with the UE.

Aspect 24: The method of any of Aspects 15-23, further comprising releasing the PUR when the message includes a request to release the PUR.

Aspect 25: The method of any of Aspects 15-23, further comprising reconfiguring the PUR when the message includes a request to reconfigure the PUR.

Aspect 26: The method of any of Aspects 15-25, wherein the message includes a request to release the PUR or a request to reconfigure the PUR.

Aspect 27: The method of any of Aspects 15-26, wherein the message is a radio resource control message.

Aspect 28: A method of wireless communication performed by a base station, comprising: transmitting, to a UE, a message including a PUR configuration, wherein the message including the PUR configuration does not include information indicating an association between the UE and the PUR configuration; and configuring the UE to transmit a request to release a PUR or a request to reconfigure the PUR using only an uplink resource configured based on the PUR when an identifier of the UE that was used to establish a radio resource control connection prior to the transmitting of the message including the PUR configuration is modified.

Aspect 29: The method of Aspect 28, wherein the identifier of the UE includes a system architecture evolution temporary mobile subscriber identity, associated with the UE, that was used to establish a radio resource control connection prior to the transmitting of the message including the PUR configuration.

Aspect 30: A method of wireless communication performed by a UE, comprising: receiving, from a base station, a message including a PUR configuration, wherein the message including the PUR configuration does not include information indicating an association between the UE and the PUR configuration; determining that an identifier of the UE that was used to establish a radio resource control connection prior to the receiving of the message including the PUR configuration was modified; and transmitting a request to release a PUR or a request to reconfigure the PUR using only an uplink resource configured based on the PUR based at least in part on the determining.

Aspect 31: The method of Aspect 30, wherein the identifier of the UE includes a system architecture evolution temporary mobile subscriber identity, associated with the UE, that was used to establish a radio resource control connection prior to the receiving of the message including the PUR configuration.

Aspect 32: An apparatus for wireless communication at a device, comprising a processor; memory coupled with the processor; and instructions stored in the memory and executable by the processor to cause the apparatus to perform the method of one or more of Aspects 1-14.

Aspect 33: A device for wireless communication, comprising a memory and one or more processors coupled to the memory, the one or more processors configured to perform the method of one or more of Aspects 1-14.

Aspect 34: An apparatus for wireless communication, comprising at least one means for performing the method of one or more of Aspects 1-14.

Aspect 35: A non-transitory computer-readable medium storing code for wireless communication, the code comprising instructions executable by a processor to perform the method of one or more of Aspects 1-14.

Aspect 36: A non-transitory computer-readable medium storing a set of instructions for wireless communication, the set of instructions comprising one or more instructions that, when executed by one or more processors of a device, cause the device to perform the method of one or more of Aspects 1-14.

Aspect 37: An apparatus for wireless communication at a device, comprising a processor; memory coupled with the processor; and instructions stored in the memory and executable by the processor to cause the apparatus to perform the method of one or more of Aspects 15-27.

Aspect 38: A device for wireless communication, comprising a memory and one or more processors coupled to the memory, the one or more processors configured to perform the method of one or more of Aspects 15-27.

Aspect 39: An apparatus for wireless communication, comprising at least one means for performing the method of one or more of Aspects 15-27.

Aspect 40: A non-transitory computer-readable medium storing code for wireless communication, the code comprising instructions executable by a processor to perform the method of one or more of Aspects 15-27.

Aspect 41: A non-transitory computer-readable medium storing a set of instructions for wireless communication, the set of instructions comprising one or more instructions that, when executed by one or more processors of a device, cause the device to perform the method of one or more of Aspects 15-27.

Aspect 42: An apparatus for wireless communication at a device, comprising a processor; memory coupled with the processor; and instructions stored in the memory and executable by the processor to cause the apparatus to perform the method of one or more of Aspects 28-29.

Aspect 43: A device for wireless communication, comprising a memory and one or more processors coupled to the memory, the one or more processors configured to perform the method of one or more of Aspects 28-29.

Aspect 44: An apparatus for wireless communication, comprising at least one means for performing the method of one or more of Aspects 28-29.

Aspect 41: A non-transitory computer-readable medium storing code for wireless communication, the code comprising instructions executable by a processor to perform the method of one or more of Aspects 28-29.

Aspect 42: A non-transitory computer-readable medium storing a set of instructions for wireless communication, the set of instructions comprising one or more instructions that, when executed by one or more processors of a device, cause the device to perform the method of one or more of Aspects 28-29.

Aspect 43: An apparatus for wireless communication at a device, comprising a processor; memory coupled with the processor; and instructions stored in the memory and executable by the processor to cause the apparatus to perform the method of one or more of Aspects 30-31.

Aspect 44: A device for wireless communication, comprising a memory and one or more processors coupled to the memory, the one or more processors configured to perform the method of one or more of Aspects 30-31.

Aspect 45: An apparatus for wireless communication, comprising at least one means for performing the method of one or more of Aspects 30-31.

Aspect 46: A non-transitory computer-readable medium storing code for wireless communication, the code comprising instructions executable by a processor to perform the method of one or more of Aspects 30-31.

Aspect 47: A non-transitory computer-readable medium storing a set of instructions for wireless communication, the set of instructions comprising one or more instructions that, when executed by one or more processors of a device, cause the device to perform the method of one or more of Aspects 30-31.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining a first identifier indicating an association between the UE and a preconfigured uplink resource (PUR), wherein the UE is associated with the first identifier at a time at which the PUR is configured or reconfigured; and
   transmitting a message for requesting a release or a reconfiguration of the PUR, wherein the message includes the first identifier indicating the association between the UE and the PUR, wherein, prior to transmitting the message, the first identifier is modified to form a second identifier associated with the UE since the time at which the PUR was configured or reconfigured, and wherein the message does not include the second identifier.

2. The method of claim 1, wherein the first identifier indicating the association between the UE and the PUR is included in the message based at least in part on a determination that the first identifier has been modified to form the second identifier since the time at which the PUR was configured or reconfigured.

3. The method of claim 2, wherein the first identifier includes a system architecture evolution temporary mobile subscriber identity, associated with the UE, that was used to establish a radio resource control connection prior to a PUR configuration, associated with the PUR, being received by the UE.

4. The method of claim 1, wherein the first identifier indicating the association between the UE and the PUR is received in a PUR configuration associated with the PUR.

5. The method of claim 4, wherein the PUR configuration is received based at least in part on a PUR request transmitted by the UE.

6. The method of claim 1, wherein the PUR is a contention-free dedicated PUR.

7. The method of claim 1, wherein the PUR is a contention-free shared PUR.

8. The method of claim 1, wherein the first identifier indicating the association between the UE and the PUR includes a PUR radio network temporary identifier (RNTI).

9. The method of claim 1, wherein the second identifier includes at least a portion of the first identifier.

10. The method of claim 9, wherein the first identifier includes a system architecture evolution temporary mobile subscriber identity, associated with the UE, that was used to establish a radio resource control connection prior to a PUR configuration, associated with the PUR, being received by the UE.

11. The method of claim 9, further comprising storing the first identifier based at least in part on the first identifier being modified to form the second identifier after the time at which the PUR was configured or reconfigured.

12. The method of claim 1, wherein the first identifier indicating the association between the UE and the PUR includes a combination of a PUR radio network temporary identifier (RNTI) associated with the UE and a RNTI resolution identifier associated with the UE.

13. The method of claim 1, wherein the message includes a request to release the PUR or a request to reconfigure the PUR.

14. The method of claim 1, wherein the message is a radio resource control message.

15. A method of wireless communication performed by a network entity, comprising:
receiving a message including a first identifier indicating an association between a user equipment (UE) and a preconfigured uplink resource (PUR),
wherein the UE is associated with the first identifier at a time at which the PUR is configured or reconfigured, and
wherein, prior to receiving the message, the first identifier is modified to form a second identifier associated with the UE since the time at which the PUR was configured or reconfigured, wherein the message does not include the second identifier; and
identifying the UE associated with the PUR based at least in part on the first identifier indicating the association between the UE and the PUR.

16. The method of claim 15, wherein the first identifier indicating the association between the UE and the PUR is transmitted in a PUR configuration associated with the PUR.

17. The method of claim 16, wherein the PUR configuration is transmitted based at least in part on a PUR request received from the UE.

18. The method of claim 15, wherein the PUR is a contention-free dedicated PUR or is a contention-free shared PUR.

19. The method of claim 15, wherein the first identifier indicating the association between the UE and the PUR includes a PUR radio network temporary identifier (RNTI).

20. The method of claim 15, wherein the second identifier includes at least a portion of the first identifier.

21. The method of claim 20, wherein the first identifier includes a system architecture evolution temporary mobile subscriber identity, associated with the UE, that was used to establish a radio resource control connection prior to a PUR configuration, associated with the PUR, being received by the UE.

22. The method of claim 15, wherein the first identifier indicating the association between the UE and the PUR includes a combination of a PUR radio network temporary identifier (RNTI) associated with the UE and a RNTI resolution identifier associated with the UE.

23. The method of claim 15, further comprising releasing the PUR when the message includes a request to release the PUR.

24. The method of claim 15, further comprising reconfiguring the PUR when the message includes a request to reconfigure the PUR.

25. The method of claim 15, wherein the message includes a request to release the PUR or a request to reconfigure the PUR.

26. The method of claim 15, wherein the message is a radio resource control message.

27. A method of wireless communication performed by a network entity, comprising:
transmitting, to a user equipment (UE), a message including a preconfigured uplink resource (PUR) configuration,
wherein the message including the PUR configuration does not include information indicating an association between the UE and the PUR configuration; and
configuring the UE to transmit a request to release a PUR or a request to reconfigure the PUR using only an uplink resource configured based on the PUR when a first identifier of the UE that was used to establish a radio resource control connection prior to the transmitting of the message including the PUR configuration is modified to form a second identifier,
wherein the request to release the PUR or the request to reconfigure the PUR includes the first identifier to indicate the association between the UE and the PUR configuration, wherein the first identifier is modified to form the second identifier prior to the request to release the PUR or the request to reconfigure the PUR being received by the network entity, and wherein the request to release the PUR or the request to reconfigure the PUR does not include the second identifier.

28. The method of claim 27, wherein the first identifier of the UE includes a system architecture evolution temporary mobile subscriber identity, associated with the UE, that was used to establish the radio resource control connection prior to the transmitting of the message including the PUR configuration.

29. A method of wireless communication performed by a user equipment (UE), comprising:
receiving, from a network entity, a message including a preconfigured uplink resource (PUR) configuration,
wherein the message including the PUR configuration does not include information indicating an association between the UE and the PUR configuration;
determining that a first identifier of the UE that was used to establish a radio resource control connection prior to the receiving of the message including the PUR configuration was modified to form a second identifier; and
transmitting, based at least in part on the determining, a request to release a PUR or a request to reconfigure the PUR using only an uplink resource configured based on the PUR,
wherein the request to release the PUR or the request to reconfigure the PUR includes the first identifier to indicate the association between the UE and the PUR configuration, wherein first identifier is modified to form the second identifier prior to transmitting the request to release the PUR or the request to reconfigure the PUR, and wherein the request to release the PUR or the request to reconfigure the PUR does not include the second identifier.

30. The method of claim 29, wherein the first identifier of the UE includes a system architecture evolution temporary mobile subscriber identity, associated with the UE, that was used to establish the radio resource control connection prior to the receiving of the message including the PUR configuration.

* * * * *